Oct. 14, 1930.  E. D. BUTZ  1,778,378
TELEPHONE SYSTEM
Filed April 27, 1929
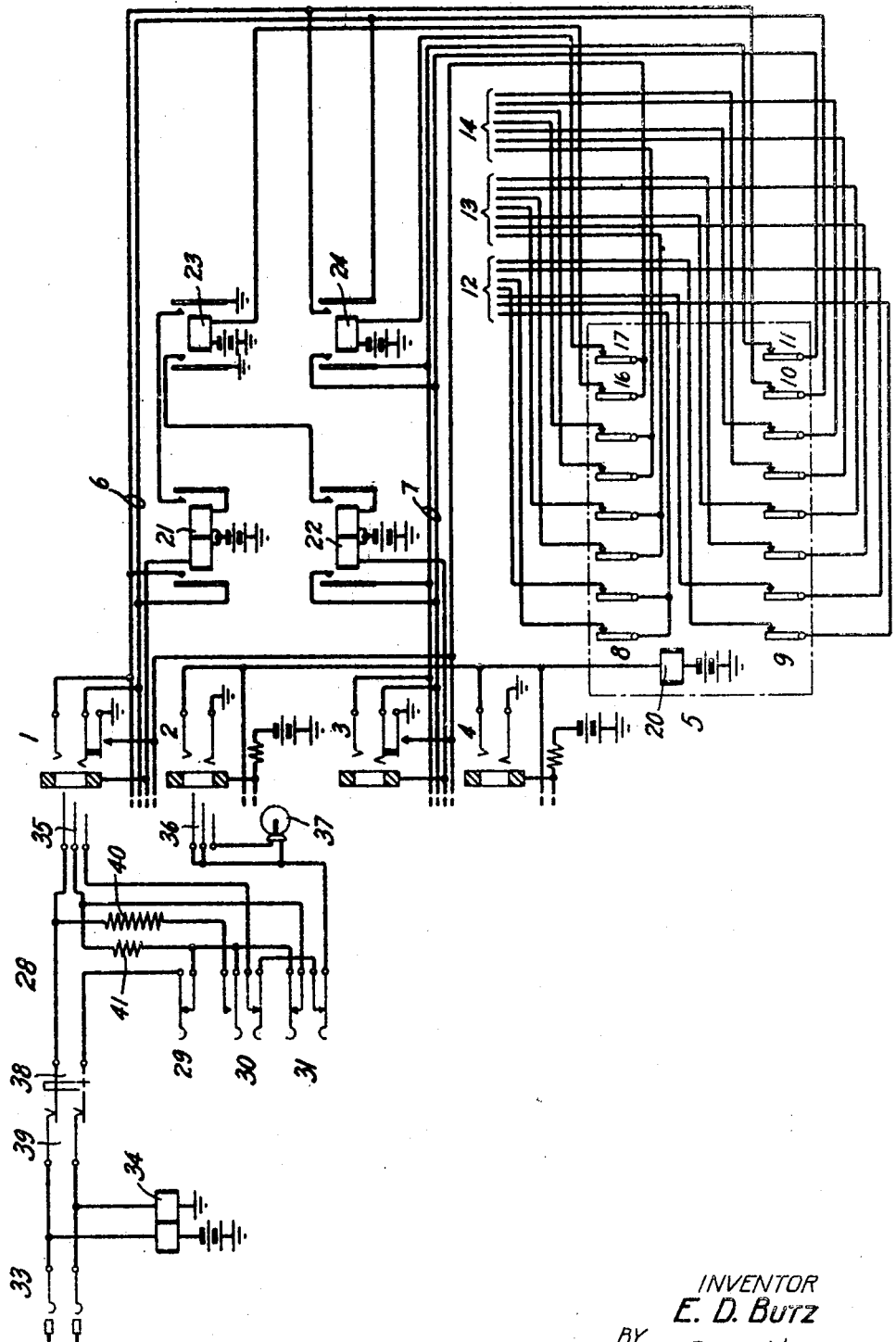
INVENTOR
E. D. Butz
BY M. R. McKenney
ATTORNEY Patented Oct. 14, 1930

1,778,378

UNITED STATES PATENT OFFICE

EDWARD D. BUTZ, OF PALISADE, NEW JERSEY, ASSIGNOR TO BELL TELEPHONE LABORATORIES, INCORPORATED, OF NEW YORK, N. Y., A CORPORATION OF NEW YORK

TELEPHONE SYSTEM

Application filed April 27, 1929. Serial No. 358,502.

This invention relates to telephone systems and particularly to means for testing automatic switches.

An object of the invention is to simplify the testing equipment and to facilitate the making of the tests in automatic exchanges.

Automatic switches, as is well known in the art, may be tested as to their normal functions for selecting lines by actuating their operating magnets through suitable testing circuits therefor. A common means for this purpose comprises an interrupting device and circuit arrangements whereby the test man may associate this device with the switches to be tested and thereby cause the actuation of the operating magnets through series of interruptions in the pulsing circuits therefor under the control of the interrupting device.

According to this invention, an improvement has been made over these prior testing devices by providing an arrangement in which a common interrupting device is located at a convenient point in an exchange with connecting circuits terminating at a plurality of points throughout the exchange for the connection and control of a plurality of switches simultaneously.

A feature of this invention is a system in which control relays, for preventing partial series of circuit interruptions from being sent out and for controlling the number of impulses in each series, are so arranged that one set of such relays is common to each pair of connecting circuits.

This invention has been illustrated in the accompanying drawing in which it has been shown applied to a testing system suitable for use in automatic telephone exchanges.

Referring now to the drawing, the two sets of jacks 1 and 2, and 3 and 4 may be located at a convenient point in the exchange on a frame near switches that are to be tested. Connections from these jacks may be multiplied to other sets of jacks at other positions throughout the exchange. A usual arrangement would be to have two sets of jacks located at each point so that the test men may have access to at least two testing paths at each location. The test jacks are associated with an interrupting device 5 through their respective connecting circuits 6 and 7. This interrupter is divided into two groups of contact springs 8 and 9. The contact springs of group 8 are arranged to interrupt circuits at a low speed and the contact springs of the group 9 are arranged to interrupt circuits at a high speed. There are sufficient contact springs for controlling four groups of connecting circuits leading to jacks. For example, connecting circuit 6 for jacks 1 and 2 is controlled by contact springs 10 and the connecting circuit 7 for jacks 3 and 4 is controlled by contact springs 11, while three other groups of two connecting circuits each are provided for at other contact springs of the high speed group 9. These three groups of connecting circuits are shown only extending to points 12, 13 and 14, respectively. It should be understood that these connecting circuits may terminate in jacks in the same manner as connecting circuits 6 and 7 at suitable points throughout the exchange for testing purposes. The two contact springs 10 and 11 in the high speed group 9 open and close the connecting circuits 6 and 7 respectively, at the same time and two of the contact springs 16 and 17 on the low speed group 8 control the number of impulses in each series of impulses produced by impulse springs 10 and 11. Contact spring 16 controls the circuits so that parts of series of impulses are not transmitted, as will hereinafter be described. This interrupting device is driven by a motor means controlled by a relay 20. The device has only been shown in diagrammatic form as any means well known in the art may be employed for this purpose. Relays 21 and 22 are provided for the individual control over the connecting circuits 6 and 7 respectively and relays 23 and 24 function in the control over both connecting circuits, as will hereinafter be described.

The only portable portions of this test equipment are cords such as the cord 28 which may be carried by the test men and used in establishing connections between the multiple jacks of the connecting circuits and the switches to be tested. Cord 28 is provided with keys for controlling the lines to be tested. Key 29 is used for releasing a switch under test, key 30 for performing insulation resistance tests and key 31 for resistance tests as will be hereinafter described. One of the switches to be tested has been indicated at 33 with its pulsing relay 34. It should be understood that the switches to be tested may be any step-by-step selectors, connectors or other type of switch that function in response to impulses sent out from the testing apparatus and switch 33 has therefore only been shown in sufficient diagrammatical form to illustrate this invention.

To test the switch 33 the test man inserts plugs 35 and 36 of cord 28 in jacks 1 and 2, respectively, assuming that jacks 1 and 2 are located near switch 33. A circuit is now closed for the lighting of lamp 37 as follows: from battery, through a resistance, through the sleeve terminals of jack 2 and plug 36, lamp 37, back through the ring terminals and plug 36 and jack 2 to ground. When lamp 37 lights brightly, it indicates that there is no other cord connected through a multiple jack of connecting circuit 6 for the testing of a switch at another point in the exchange. If the lamp lights dimly it would indicate that this connecting circuit is already in use, that is, another lamp such as 37 is lighted in parallel and consequently lamp 37 will receive less current and light dimly. Another circuit is closed by the connection of cord 28, for the starting of the interrupting device. This circuit extends from battery, relay 20, tip and ring terminals of jack 2 and plug 36 to ground. The interrupting device will now remain actuated to interrupt its contact springs as long as plugs 35 and 36 remain inserted in jacks 1 and 2. Relay 21 is also operated over a circuit from battery, left-hand winding of this relay, sleeve terminals of jack 1 and plug 35, contacts of keys 30 and 31 to ground at the ring terminals of plug 36 and jack 2. The operation of the interrupting device now causes relays 23 and 24 to be alternately operated as will hereinafter be described through circuits from battery, through the windings of these relays, contacts 16 and 17, respectively, to ground at the closed contacts of jack 1. The connecting circuit 6 will also be interrupted at contacts 10 to simulate dialing impulses.

The next step on the part of the test man will be to insert the other plug 38 of cord 28 in the test jack 39 of the switch 33. A circuit is now closed from battery and ground through the windings of the pulsing relay 34 through the cord 28 to the connecting circuit 6 and through the short-circuit closed at the left-hand armature and front contact of relay 21. Relay 34 operates in this circuit and thereby prepares the connections in the switch 33 for the reception of testing impulses. Either key 30 or 31 is now operated to begin the test. These keys are for the purpose of performing different types of test. For example, if key 30 is operated an insulation resistance test will be performed by placing the resistance 40 across the tip and ring conductor, whereas if key 31 is operated, the resistance 41 will be connected in series with the line for the resistance testing of the switch. In the first case relay 34 is tested as to its release characteristics and in the latter case as to its operating characteristics. When either of these keys is operated, the above mentioned circuit for relay 21 is opened.

It should be mentioned here that the contact springs 10, 16 and 17 are so related in regard to open and closed periods that springs 16 remain closed while springs 10 interrupt the connecting circuit 6 nine times after which period the springs 17 close and shortly thereafter springs 16 open. Springs 17 remain closed for the period between the series of impulses and open shortly after springs 16 again close to permit a second series of impulses to be delivered to the connection circuit 6 by springs 10. If relay 23 is operated by springs 16 being closed at the time the key is operated relay 21 will not release due to the locking circuit through its right-hand winding controlled by relay 23. Relay 21 will therefore hold the circuit for pulsing relay 34 closed under control of relay 23. When now springs 17 close and springs 16 shortly thereafter open, relay 24 will operate and then relay 23 will release. Relay 24 in operating will maintain the circuit through the connecting circuit 6 at its right-hand armature and front contact closed so as to still maintain relay 34 operated even though relays 23 and 21 have released and opened the connecting circuit at another point. Relay 24 will now release due to the opening of springs 17 after a period representing the pause between series of impulses and since relays 21 and relay 23 are released, the short circuit through the right-hand armature and front contact of relay 24 is opened. The pulsing relay 34 will now be released from control relays 24, 23 and 21 but on the other hand the connecting circuit 6 and relay 34 will now be entirely under control of springs 10. Hence the relay 34 will be alternately operated and released in accordance with the opening and closing at springs 10. The open and closed periods of the connecting circuit 6 simulate dial pulses in ordinary automatic telephone systems and cause the switch 33 to advance its brushes nine steps in its first movement. After the springs 10 have opened nine successive times, relay 24 is again operated, by the closure of springs 17, to short circuit the connecting circuit and thereby maintain the pulsing relay operated until springs 17 are again opened, the period of closure of springs 17 being equal to the usual pause between series of impulses. Relay 24 is then again released and pulsing relay 34 will again be placed under control of springs 10 and receive a second series of impulses to cause the switch 33 to take nine steps in its second movement. The key 30 or 31 should be held operated until complete trains of impulses have been received. When a key is released, relay 21 will be energized and no further test will be performed on switch 33 until the key is again operated.

If the test man had inserted the plugs 35 and 36 into jacks 3 and 4, respectively, the circuits would have operated in the same manner as hereinbefore described except that in place of relay 21, relay 22 would have operated when the connection was first made. Relays 23 and 24 will in this case control the operation of the pulsing relay 34 by successive series of impulses, each over the connecting circuit 7. It is evident that the test men may employ both connecting circuits for simultaneous tests of line switches without interference. If it is decided to release the pulsing relay 34 of switch 33 while still maintaining the connection through the testing equipment through the cord 28, key 29 may be operated. The operation of this key opens the connection through the ring conductors. It should be understood that the key 30 or 31 may be held operated to cause as many successive trains of impulses to be transmitted as may be necessary for the testing of succeeding switches in addition to switch 33 in systems where this is desirable.

While this invention has been illustrated as applied in a single testing system, it may be equally well applied to other systems without departing from the spirit of the invention which should be limited merely by the scope of the appended claims.

What is claimed is:

1. In a testing system, a pair of connecting circuits each having a plurality of outlets, means for making connection to said circuits at any one of said outlets, an interrupting device for delivering impulses to each of said connecting circuits, and means common to the connecting circuits for controlling the delivery of said impulses to said circuits.

2. In a testing system, a pair of connecting circuits each having a plurality of outlets, means for making connection to said circuits at any one of said outlets, an interrupting device for delivering impulses to each of said connecting circuits, and means common to the connecting circuits for controlling delivery of series of impulses of equal number of impulses in each series to said circuits.

3. In a testing system, a pair of connecting circuits each having a plurality of outlets, means for making connection to said circuits at any one of said outlets, an interrupting device for delivering impulses to each of said connecting circuits, and means including two relays for controlling the delivery of series of impulses of equal number of impulses in each series and for preventing a portion of any series of impulses from being delivered.

4. In a testing system, a pair of connecting circuits each having a plurality of outlets, means for making connections to said circuits at any one of said outlets, an interrupting device for delivering impulses to each of said connecting circuits, and means including two relays common to said connecting circuits and responsive to the establishing of a connection at any one of said outlets, one relay for controlling the delivery of said impulses in series and the other relay for preventing a portion of the series of impulses from being delivered regardless of the time at which a connection is made at an outlet.

5. In a testing system, connecting circuits arranged in pairs, each connecting circuit having a plurality of outlets, means for establishing connections at said outlets to said connecting circuits, a high speed interrupter for delivering impulses to said connecting circuits, a low speed interrupter, means including two relays for each pair of connecting circuits, one relay actuated by said low speed interrupter to control the delivery of series of impulses from said high speed interrupter to said connecting circuits and the other relay actuated by said low speed interrupter to prevent portions of said series of impulses from being delivered.

6. In a testing system, connecting circuits arranged in pairs, each connecting circuit having a plurality of outlets, means for establishing connections at said outlets to said connecting circuits, an interrupting device for delivering impulses to said connecting circuits and means for each pair of connecting circuits for controlling the delivery of said impulses to said circuits.

7. In a testing system, a pair of connecting circuits each having a plurality of outlets, means for establishing connections to said circuits at any one of said outlets, an interrupting device for delivering impulses to said connecting circuits, means including a relay common to said circuits for controlling the delivery of said impulses in series, and means including a relay for each circuit and the relay common to said circuits for preventing a portion of the series of the impulses from being delivered.

8. In a testing system, connecting circuits arranged in pairs, each connecting circuit having a plurality of outlets, means for establishing connections at said outlets to said connecting circuits, a high speed interrupter for delivering impulses to said connecting circuits, a low speed interrupter, means including a relay common to each pair of connecting circuits actuated by said low speed interrupter to control delivery of series of impulses from said high speed interrupter to said connecting circuits, and means including a relay for each circuit and a relay common to each pair of circuits for preventing portions of said series of impulses from being delivered, said last mentioned relays common to each pair of connecting circuits being actuated by said low speed interrupter.

In witness whereof, I hereunto subscribe my name this 25th day of April, 1929.

EDWARD D. BUTZ.